United States Patent
Espinoza et al.

(10) Patent No.: US 9,358,526 B2
(45) Date of Patent: *Jun. 7, 2016

(54) OPTIMIZED FISCHER-TROPSCH CATALYST

(71) Applicant: Emerging Fuels Technology, Inc., Tulsa, OK (US)

(72) Inventors: Rafael L. Espinoza, Tulsa, OK (US); Kenneth L. Agee, Tulsa, OK (US)

(73) Assignee: EMERGING FUELS TECHNOLOGY, INC., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,400

(22) Filed: Oct. 28, 2015

(65) Prior Publication Data

US 2016/0074837 A1 Mar. 17, 2016

Related U.S. Application Data

(63) Continuation-in-part of application No. 14/546,132, filed on Nov. 18, 2014, now Pat. No. 9,180,436.

(60) Provisional application No. 61/906,166, filed on Nov. 19, 2013.

(51) Int. Cl.
| | | |
|---|---|---|
| B01J 21/00 | (2006.01) |
| B01J 21/04 | (2006.01) |
| B01J 23/00 | (2006.01) |
| B01J 23/02 | (2006.01) |
| B01J 23/08 | (2006.01) |
| B01J 23/10 | (2006.01) |
| B01J 23/32 | (2006.01) |
| B01J 23/40 | (2006.01) |
| B01J 23/42 | (2006.01) |
| B01J 23/44 | (2006.01) |
| B01J 23/56 | (2006.01) |
| B01J 23/58 | (2006.01) |
| B01J 23/60 | (2006.01) |

(Continued)

(52) U.S. Cl.
CPC ..................................... *B01J 23/75* (2013.01)

(58) Field of Classification Search
CPC ............ B01J 23/75; B01J 23/76; B01J 23/78; B01J 23/80; B01J 23/83; B01J 23/84; B01J 23/8913; B01J 23/8933; B01J 21/00; B01J 21/04; B01J 21/06; B01J 21/063; B01J 21/066; B01J 21/08
USPC ......... 502/260, 263, 302–304, 324, 326–338, 502/349–351, 355, 439
See application file for complete search history.

(56) References Cited

U.S. PATENT DOCUMENTS

| 4,012,337 A | 3/1977 | Mitchell, III |
| 4,088,671 A | 5/1978 | Kobylinski |

(Continued)

*Primary Examiner* — Cam N. Nguyen
(74) *Attorney, Agent, or Firm* — Head, Johnson & Kachigian, P.C.

(57) ABSTRACT

A cobalt containing catalyst supported on a metal oxide suitable for performing a Fischer-Tropsch reaction. A pore volume of a metal oxide support, before loading of cobalt thereon, is within the range of 0.35 to 0.85 cc/g. The support has an average pore diameter before the cobalt loading and reduction such that the effective average pore diameter after cobalt loading and reduction is 14 nanometers or higher. A cobalt loading of 11 weight % or higher is also provided. An alpha value higher than 0.89 in a diesel to wax weight ratio below 1.07 is provided.

14 Claims, 11 Drawing Sheets

Parameters to be taken into account for the design of an optimal Fisher-Tropsch Fixed Bed Reactor

(51) Int. Cl.
 *B01J 23/70* (2006.01)
 *B01J 23/72* (2006.01)
 *B01J 23/74* (2006.01)
 *B01J 23/75* (2006.01)

(56) References Cited

U.S. PATENT DOCUMENTS

| | | |
|---|---|---|
| 4,105,590 A | 8/1978 | Koberstein et al. |
| 4,215,019 A | 7/1980 | Drake et al. |
| 4,243,610 A | 1/1981 | Drake et al. |
| 4,415,064 A | 11/1983 | Oliemuller |
| 4,493,905 A | 1/1985 | Beuther et al. |
| 4,522,939 A | 6/1985 | Minderhoud et al. |
| 4,585,798 A | 4/1986 | Beuther et al. |
| 4,613,624 A | 9/1986 | Beuther et al. |
| 4,640,766 A | 2/1987 | Post et al. |
| 4,654,458 A | 3/1987 | Jezl et al. |
| 4,670,414 A | 6/1987 | Kobylinski et al. |
| 4,686,238 A | 8/1987 | Bode et al. |
| 4,740,487 A | 4/1988 | Matheson et al. |
| 5,037,856 A | 8/1991 | Post et al. |
| 5,073,661 A | 12/1991 | Scheffer et al. |
| 5,145,876 A | 9/1992 | Shutt |
| 5,302,622 A | 4/1994 | Chaumette et al. |
| 5,504,254 A | 4/1996 | Haas et al. |
| 5,612,273 A | 3/1997 | Prada et al. |
| 5,639,798 A | 6/1997 | Wilson et al. |
| 5,800,698 A | 9/1998 | Tejada et al. |
| 5,817,595 A | 10/1998 | Tejada et al. |
| 5,846,498 A | 12/1998 | Kingsley |
| 5,916,838 A | 6/1999 | Wulff-Doring et al. |
| 5,939,350 A | 8/1999 | Singleton et al. |
| 5,958,825 A | 9/1999 | Wulff-Doring et al. |
| 5,965,481 A | 10/1999 | Durand et al. |
| 5,985,790 A | 11/1999 | Moskovitz et al. |
| 6,013,834 A | 1/2000 | Colling |
| 6,084,125 A | 7/2000 | Kingsley et al. |
| 6,191,066 B1 | 2/2001 | Singleton et al. |
| 6,262,132 B1 | 7/2001 | Singleton et al. |
| 6,271,432 B2 | 8/2001 | Singleton et al. |
| 6,365,770 B1 | 4/2002 | Bunel et al. |
| 6,372,939 B1 | 4/2002 | Bunel et al. |
| 6,410,477 B1 | 6/2002 | Ohtsuka et al. |
| 6,465,530 B2 | 10/2002 | Roy-Auberger et al. |
| 6,515,035 B2 | 2/2003 | Roy-Auberger et al. |
| 6,602,921 B2 | 8/2003 | Manzer et al. |
| 6,623,621 B1 | 9/2003 | Iaccino et al. |
| 6,689,819 B2 | 2/2004 | Bellussi et al. |
| 6,818,189 B1 | 11/2004 | Adris et al. |
| 6,835,690 B2 | 12/2004 | Van Berge et al. |
| 6,927,190 B2 | 8/2005 | Lok et al. |
| 6,977,273 B2 | 12/2005 | Roy-Auberger et al. |
| 7,012,103 B2 | 3/2006 | Espinoza et al. |
| 7,012,104 B2 | 3/2006 | Espinoza et al. |
| 7,014,750 B2 | 3/2006 | Boger et al. |
| 7,018,591 B2 | 3/2006 | Le |
| RE39,073 E | 4/2006 | Herbolzheimer et al. |
| 7,022,741 B2 | 4/2006 | Jiang et al. |
| 7,056,857 B2 | 6/2006 | Srinivasan et al. |
| 7,067,455 B2 | 6/2006 | Chen et al. |
| 7,071,239 B2 | 7/2006 | Ortego, Jr. et al. |
| 7,084,180 B2 | 8/2006 | Wang et al. |
| 7,098,251 B2 | 8/2006 | Clerici et al. |
| 7,163,963 B2 | 1/2007 | Fraenkel |
| 7,176,160 B2 | 2/2007 | Espinoza et al. |
| 7,186,757 B2 | 3/2007 | Espinoza et al. |
| 7,226,954 B2 | 6/2007 | Tavasoli et al. |
| 7,276,540 B2 | 10/2007 | Espinoza et al. |
| 7,341,976 B2 | 3/2008 | Espinoza et al. |
| 7,351,679 B2 | 4/2008 | Eri et al. |
| 7,361,626 B2 | 4/2008 | Baijense et al. |
| 7,402,612 B2 | 7/2008 | Jin et al. |
| 7,452,844 B2 | 11/2008 | Hu et al. |
| 7,510,994 B2 | 3/2009 | Ikeda et al. |
| 7,534,340 B2 | 5/2009 | Calemma |
| 7,541,310 B2 | 6/2009 | Espinoza |
| 7,585,812 B2 | 9/2009 | Hu et al. |
| 7,678,952 B2 | 3/2010 | Dupain et al. |
| 7,732,370 B2 | 6/2010 | Casci et al. |
| 7,837,954 B2 | 11/2010 | Lehr |
| 7,846,977 B2 | 12/2010 | Baijense et al. |
| 7,880,046 B2 | 2/2011 | Godsmark et al. |
| 7,884,139 B2 | 2/2011 | Baijense et al. |
| 7,939,699 B2 | 5/2011 | Lok |
| 7,973,086 B1 | 7/2011 | Saxton et al. |
| 8,013,025 B2 | 9/2011 | Steynberg et al. |
| 8,053,481 B2 | 11/2011 | Ayasse |
| 8,084,387 B2 | 12/2011 | Jun et al. |
| 8,092,747 B2 | 1/2012 | Piccolo et al. |
| 8,324,128 B2 | 12/2012 | Rytter et al. |
| 8,394,862 B1 | 3/2013 | Schuetzle et al. |
| 8,524,787 B2 | 9/2013 | Ermolaev et al. |
| 8,598,066 B2 | 12/2013 | Bae et al. |
| 2004/0127352 A1 | 7/2004 | Jin et al. |
| 2005/0163680 A1 | 7/2005 | Le |
| 2005/0182145 A1 | 8/2005 | Mohedas et al. |
| 2008/0118018 A1 | 5/2008 | Schrauwen |
| 2008/0167391 A1 | 7/2008 | Schrauwen |
| 2010/0240936 A1 | 9/2010 | Zhang et al. |
| 2011/0160314 A1 | 6/2011 | Schrauwen |
| 2012/0071571 A1 | 3/2012 | Abbas et al. |
| 2012/0108873 A1 | 5/2012 | Chinta et al. |
| 2012/0116141 A1 | 5/2012 | Godsmark et al. |
| 2012/0149787 A1 | 6/2012 | Rytter et al. |
| 2012/0160368 A1 | 6/2012 | McKenna et al. |
| 2012/0165417 A1 | 6/2012 | Bezemer et al. |
| 2012/0277327 A1 | 11/2012 | Han et al. |
| 2012/0322898 A1 | 12/2012 | Ermolaev et al. |
| 2013/0001128 A1 | 1/2013 | Kibby et al. |
| 2013/0072717 A1 | 3/2013 | Olbert et al. |
| 2013/0116349 A1 | 5/2013 | McKenna |
| 2013/0217793 A1 | 8/2013 | Wang et al. |
| 2013/0253078 A1 | 9/2013 | Jothimurugesan et al. |

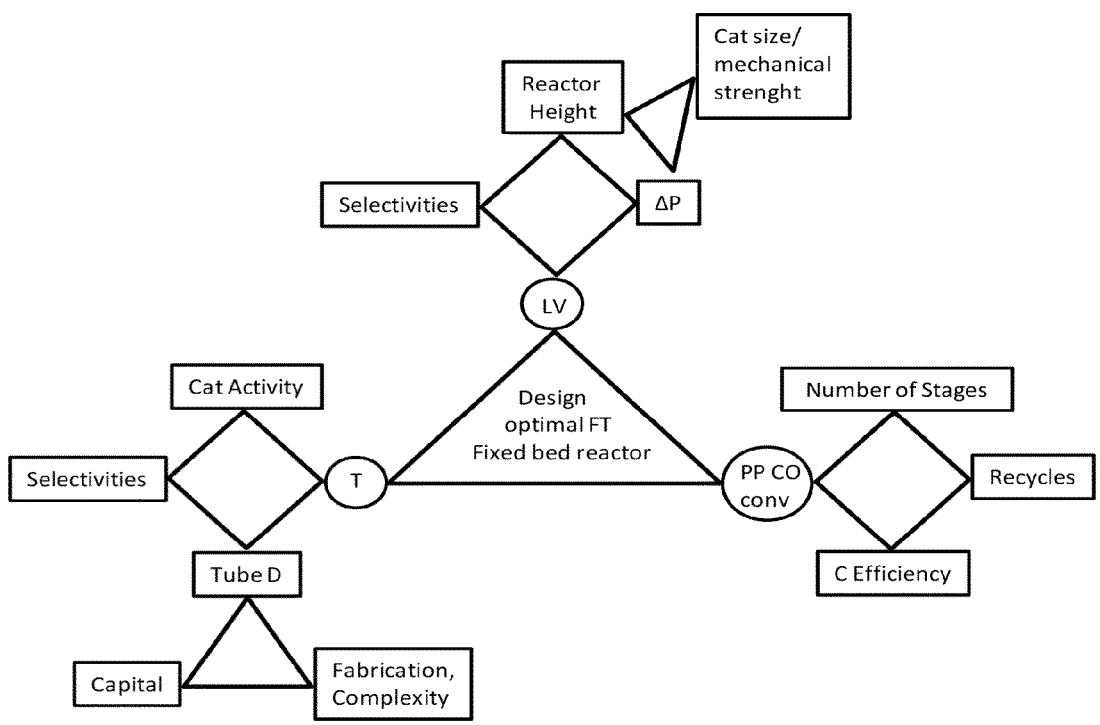
Figure 1. Parameters to be taken into account for the design of an optimal Fisher-Tropsch Fixed Bed Reactor

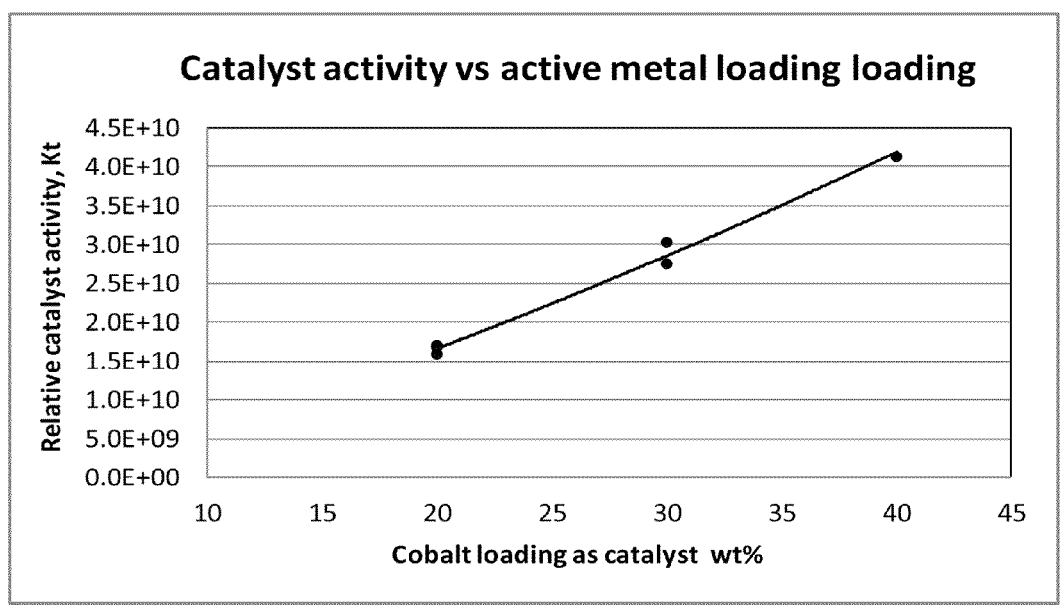
Figure 2. Fischer-Tropsch catalyst activity increases with active metal loading

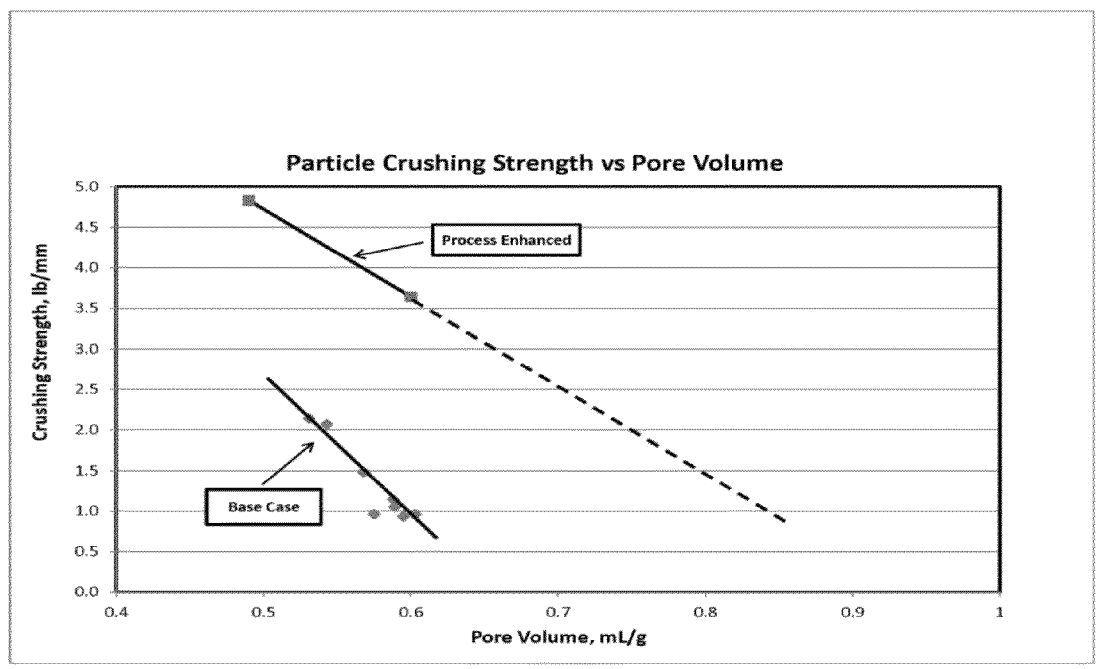
Figure 3. Support particles crush strength vs. pore volume

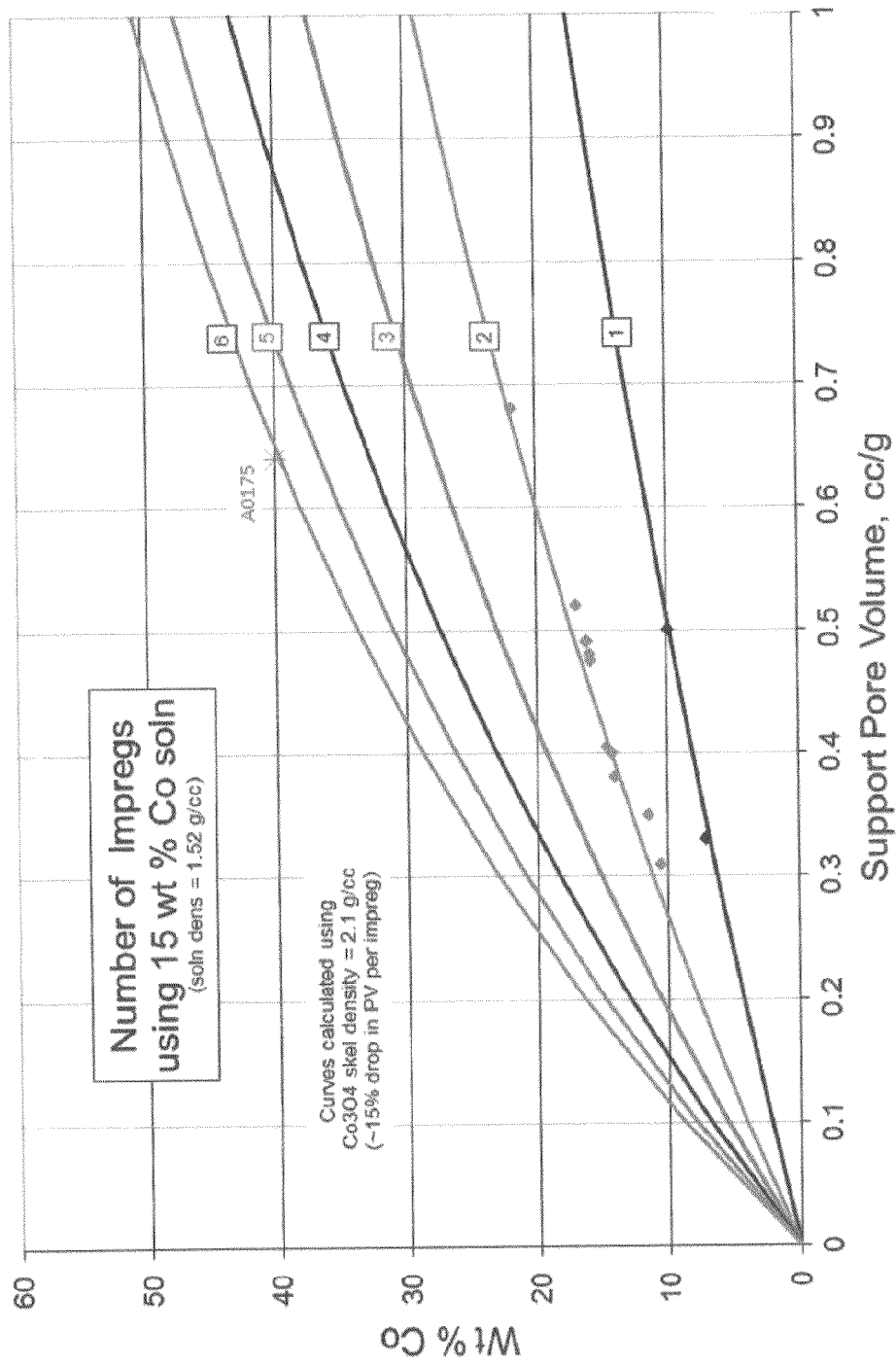
Figure 4. Cobalt Versus Pore Volume

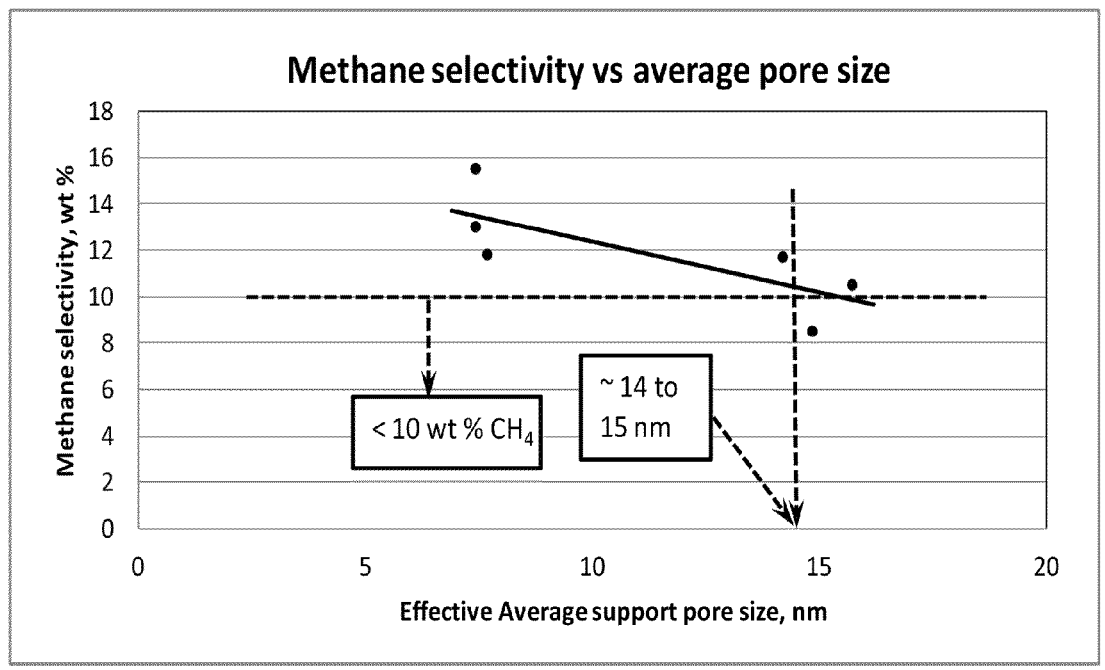
Figure 5. Effect of pore size on the methane selectivity

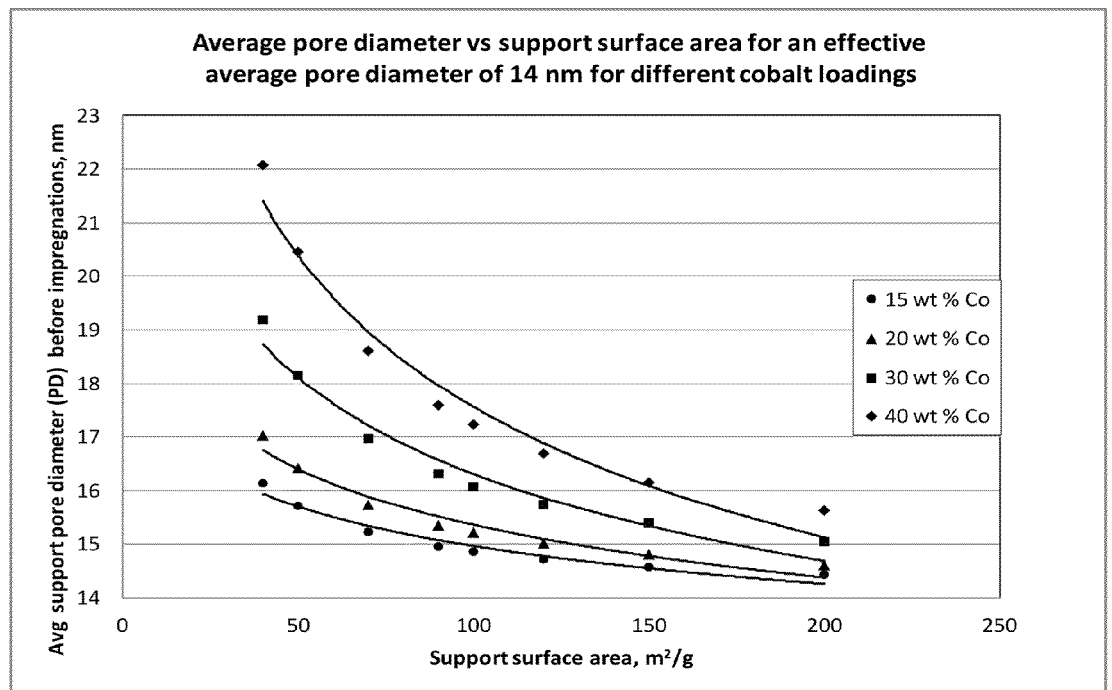
Figure 6A. Average pore diameter of the support vs surface area for en effective pore size diameter of 14 nm for different cobalt loadings

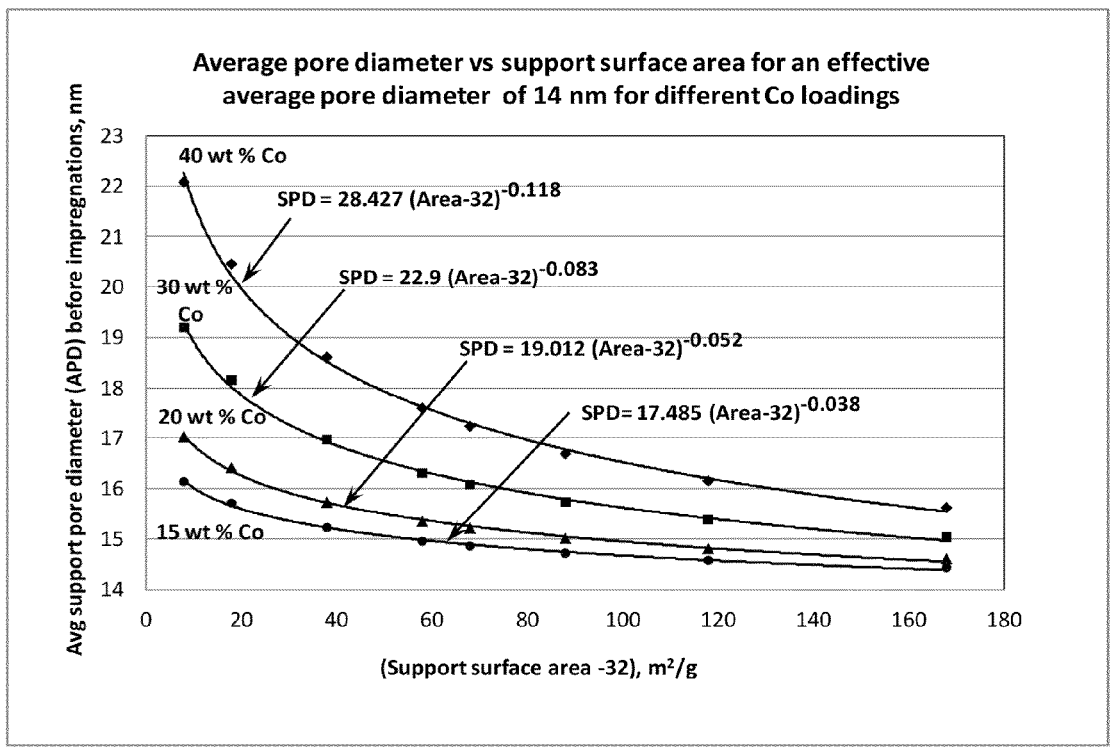
Figure 6B. Average pore diameter of the support vs surface area for en effective pore size diameter of 14 nm for different cobalt loadings

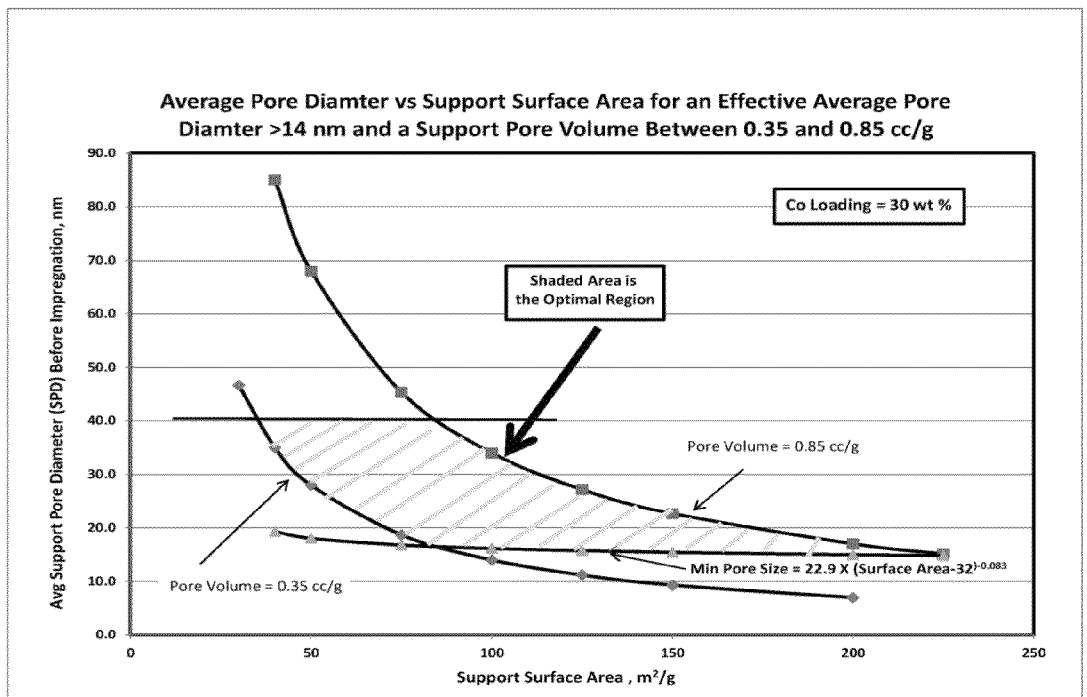
Figure 6C. Optimal region for the support average pore diameter, surface area and pore volume for a cobalt loading of 30 wt %

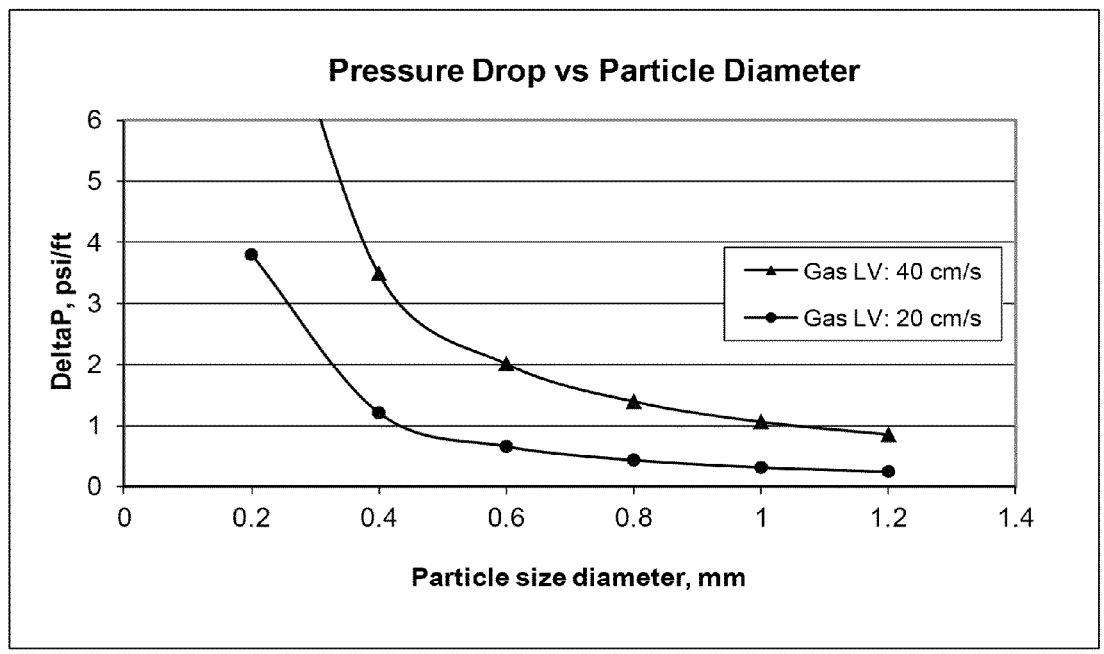
Figure 7. Pressure drop vs catalyst particle diameter

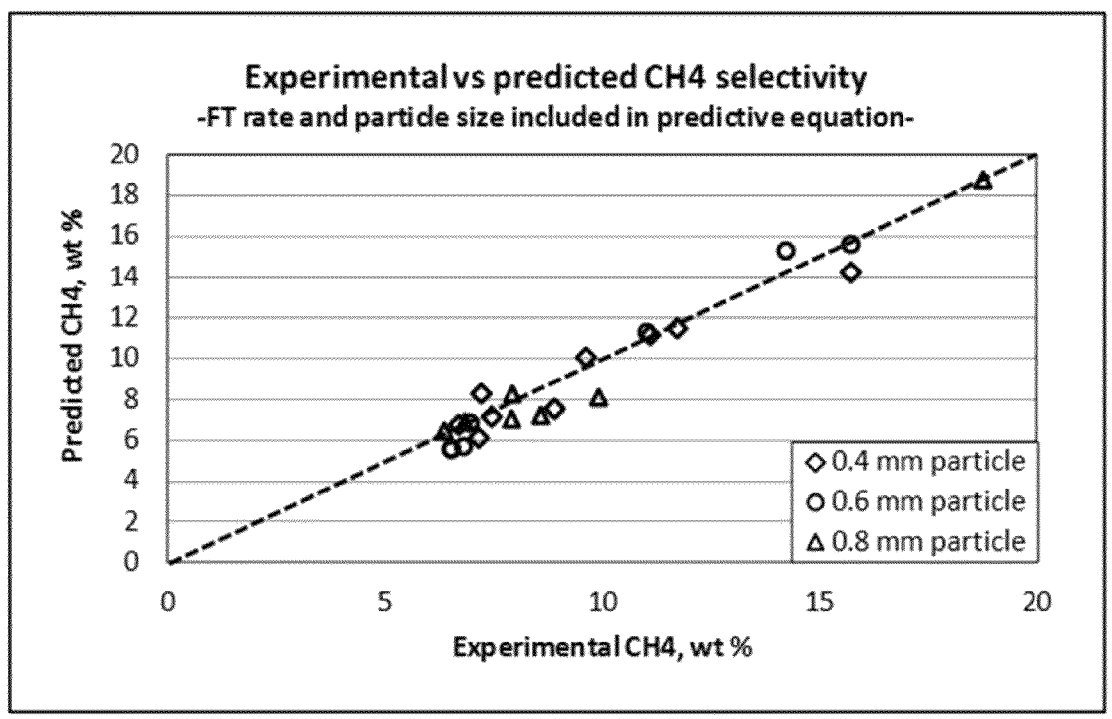
Figure 8. Parity plot for the experimental and predicted methane selectivity

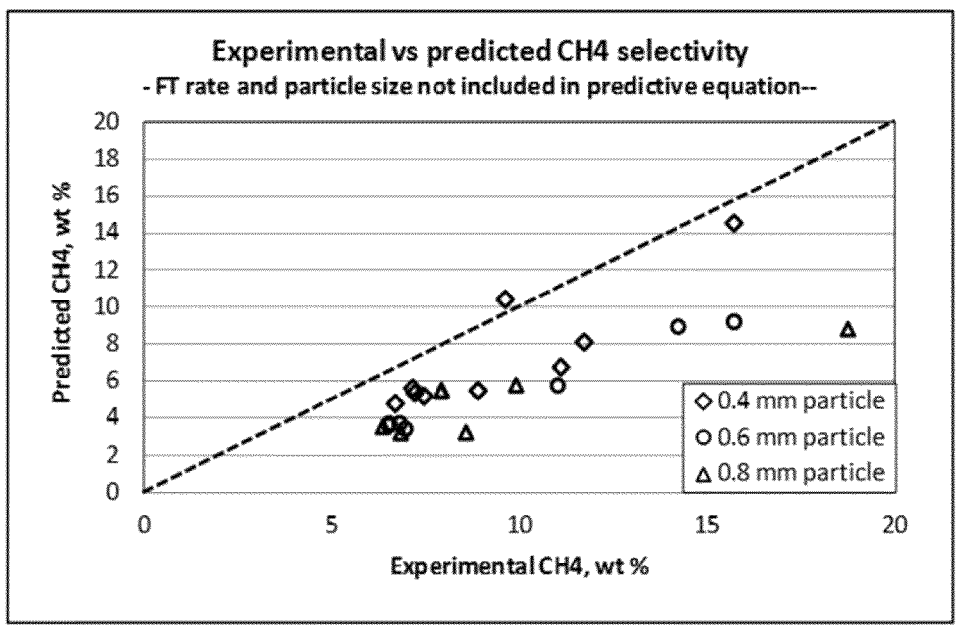
Figure 9. Parity plot for the experimental and predicted methane selectivity without the effects of the Fischer-Tropsch reaction rate and of the catalysts extrudates diameter

OPTIMIZED FISCHER-TROPSCH CATALYST

CROSS REFERENCE TO RELATED APPLICATIONS

This application is a continuation-in-part of and claims priority to U.S. Conversion Utility patent application Ser. No. 14/546,132, filed Nov. 18, 2014, now issued U.S. Pat. No. 9,180,436, which claims priority to U.S. Provisional Patent Application Ser. No. 61/906,166, filed Nov. 19, 2013, entitled "OPTIMIZED FISCHER-TROPSCH CATALYST," the contents of which are hereby incorporated by reference.

BACKGROUND OF THE INVENTION

1. Field of the Invention

The present invention relates to the production of heavy hydrocarbon products from light gaseous hydrocarbons such as natural gas, associated gas, coal seam gas, landfill gas, or biogas. In particular, the present invention relates to optimization of a catalyst for performing a Fischer-Tropsch reaction.

2. Related Art

Various processes are known for the conversion of carbonaceous feeds or light hydrocarbons containing gases into normally liquid products such as methanol, higher alcohols and hydrocarbon fuels and chemicals particularly paraffinic hydrocarbons. Such processes are directed at the objective of adding value to the feedstock by making a transportable, more valuable product such as diesel fuel or jet fuel or chemicals such as base oils or drilling fluids.

The Fischer-Tropsch process can be used to convert such feedstocks into more valuable easily transportable liquid hydrocarbon products and chemicals. The feedstock is first converted to synthesis gas comprising carbon monoxide and hydrogen. The synthesis gas is then converted to heavy hydrocarbon products over a Fischer-Tropsch catalyst. The heavy hydrocarbon products can be subjected to further workup by hydroprocessing such as hydrocracking and/or hydroisomerization and distillation resulting in, for example, a high yield of high quality middle distillate products such as jet fuel or diesel fuel. The heavy hydrocarbon products can also be upgraded to specialty products such as solvents, drilling fluids, waxes, or lube base oils due to the high purity of the Fischer-Tropsch products.

Processes that convert light hydrocarbons to heavier hydrocarbon products, for example, generally have three steps: 1) conversion of light hydrocarbon feedstock to synthesis gas comprising carbon monoxide and hydrogen; 2) conversion of the synthesis gas to heavy hydrocarbons via the Fischer-Tropsch reaction; and 3) hydroprocessing the heavy hydrocarbon product to one or more finished hydrocarbon products.

The design and optimization of the Fischer-Tropsch reactor is of paramount importance for the technical and economical success of a plant for the conversion of synthesis gas into hydrocarbons. A Fixed Bed Fischer Tropsch (FBFT) reactor is a very simple effective reactor that is very scalable.

A FBFT reactor must meet many conditions such as minimum complexity, ease of construction, minimum number of tubes, high selectivity towards desired products, high per pass conversion to avoid a second or a third stage, low pressure drop, etc.

It follows that the design of a FBFT reactor cannot be done without taking into account the characteristics and performance of the Fischer-Tropsch catalyst to be used.

This is a technical challenge that involves many variables. FIG. 1 is an attempt to visualize some of the main variables involved and to clarify their interaction.

For example, while it is known that a high activity catalyst is desired, this has an effect on the operating temperature ("T"). If the operating temperature is too high, the Fischer-Tropsch reaction rate will be high as well, increasing the possibility of a temperature excursion or run away. To avoid this, the reactor tube diameter ("D") has to be smaller to facilitate the radial heat transfer. The overall heat transfer also increases with the gas linear velocity ("LV"), but increasing the linear velocity increases the pressure drop ("$\Delta P$") from the top to the bottom of the reactor.

To lower the pressure drop at any given set of conditions, the catalyst particle size has to increase, which may result in poor selectivities due to diffusion considerations. An alternative would be to lower the tube height, although this could decrease the per pass conversion ("PP CO conv") of the carbon monoxide and, therefore, either increase the internal recycle or add another Fischer-Tropsch stage to reach the desired total CO conversion. This could also result in a larger number of shorter reactors therefore increasing the plant complexity and the capital cost. While taking all these considerations into account, the selectivity towards the desired products must not decrease.

It is therefore apparent that while the reactor design has to be easy to fabricate, it has to take into account the catalyst performance. The catalyst has to be large enough to minimize the pressure drop and to allow for an optimal reactor height based on a targeted CO per pass conversion, but not so large that it will cause a negative effect of the diffusion on the desired selectivity.

At the same time, the catalyst particle has to minimize the diffusion effect for any given particle size. This can be achieved by having pores of a diameter large enough so that the product's selectivity is not affected. On the other hand, a large pore diameter, associated with a pore volume large enough to accommodate a selected amount of Fischer-Tropsch active metal such as cobalt without narrowing the pore diameter too much and, therefore, cause diffusion problems, will weaken the mechanical strength of the catalyst particle. A low catalyst particle mechanical strength will cause catalyst breakage during the catalyst loading step and therefore increase the pressure drop to levels above design.

It is therefore necessary to develop a support for a Fischer-Tropsch catalyst that can meet all the above expectations in order to design a technically and economically viable Fischer-Tropsch process.

The current state of the art for fixed bed Fischer-Tropsch catalysts does not address all these issues and the technology described in the open art and in the patent literature is typically focused on a few of these considerations at a time, ignoring the negative effect that optimizing only one variable may have on the other variables.

Another problem in the art is the "open" optimization of the targeted parameters. That is, the optimized parameter ranges from a certain value to an infinite or zero value. In those cases, following the teachings may lead to technical failures.

Because of the above considerations, it is necessary to develop a Fischer-Tropsch Fixed Bed catalyst that can meet all the requirements for the construction of a technically and economically viable Fischer-Tropsch reactor for the selective conversion of synthesis gas into valuable hydrocarbon products. It is also desirable to develop a Fischer-Tropsch slurry bubble column reactor catalyst that can meet all the requirements for the construction of a technically and economically viable Fischer-Tropsch reactor for the selective conversion of synthesis gas into valuable hydrocarbon products.

SUMMARY OF THE INVENTION

The present invention deals with the development of an optimized Fischer-Tropsch catalyst that has enhanced selectivity towards desirable Fischer-Tropsch products while at the same time having mechanical strength as well as pressure drop characteristics and intrinsic activity suitable for optimal design and use in commercial Fischer-Tropsch Fixed Bed reactors.

The catalyst of the present invention has a defined pore volume, a defined average pore diameter, and a defined particle size.

While examples given and optimal support particle size discussion herein are related to a fixed bed reactor, the catalyst of the present invention could also be provided in a powder form and be useful in a slurry bubble column reactor ("SBCR"). For a SBCR, the particle size will be defined by the available spray dried support material typically in the 20 to 250 µm range, not the optimum support size for diffusion considerations described herein for a fixed bed reactor of between 0.4 and 1 mm.

In addition, it has been found that the crush strength of the extrudates can be greatly enhanced by one or more treatments.

BRIEF DESCRIPTION OF THE DRAWINGS

FIG. 1 is a chart illustrating parameters for the design of an optimal Fischer-Tropsch fixed bed reactor according to the present invention.

FIG. 2 is a graph illustrating catalyst activity versus metal loading.

FIG. 3 is a graph illustrating support particles crushing strength versus pore volume.

FIG. 4 is a graph illustrating the total amount of active metal impregnation versus support pore volume.

FIG. 5 is a graph illustrating methane selectivity versus average support pore size.

FIG. 6A, FIG. 6B and FIG. 6C are graphs illustrating average support pore diameter versus surface area.

FIG. 7 is a graph illustrating pressure drop versus catalyst particle diameter.

FIG. 8 is a graph illustrating experimental methane selectivity versus predicted selectivity.

FIG. 9 is a graph illustrating experimental methane selectivity versus predicted selectivity.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

A suitable Fischer-Tropsch catalyst has to have a high intrinsic activity. Preferably, this high catalyst intrinsic activity can be used in a fixed bed reactor in order to have a maximum productivity per unit volume while at the same time meeting the desired heat transfer requirements.

If the intrinsic activity of the catalyst is high enough so that the potential productivity within the regime of desired selectivities is more than that allowed by the overall heat transfer coefficient, defined among other variables by the gas linear velocity inside the reactor, then the operating temperature has to be lowered in order to maintain the Fischer-Tropsch productivity or reaction rate within the range of thermal stability of the reactor.

Lowering of the operating temperature for any given supported catalyst at a given set of operating conditions will decrease the unwanted methane selectivity as well as increase the selectivity towards valuable higher hydrocarbons.

When the cobalt is deposited in the catalyst by any suitable technique, it is normally calcined to convert the deposited cobalt into a cobalt oxide phase, prior to its reduction into cobalt metal, typically using a hydrogen containing gas at temperatures between 400° F. to 750° F. To facilitate the reduction process, reduction promoters such as Pt, Ru, Cu, Ag, Pd, or Re in amounts ranging from 0.01 to about 3 wt % may be added. The function of these promoters is to enhance the ease of reduction of the supported cobalt oxide into its metal phase, which is the active phase for the Fischer-Tropsch catalyst.

A second class of promoters is also used in the formulation of the Fischer-Tropsch catalysts. This second type of promoter has a range of different objectives. A non-restrictive list of such objectives include enhancing the mechanical strength of the support, its chemical resistance towards phase changes of the support during the Fischer-Tropsch reaction, to change the support acidity or basicity, to lower the support activity, to have a degree of control over the average cobalt crystallite sizes and to modify the metal support interaction. Examples of second type of promoters are Mn, Ba, Si, Ti, Ce, Zr, La, Na, K, Zn, Ag, Cu, Li, Ca, Cr, Ni, Fe, V, Sn, Ga, Sb, Th, and W in amounts ranging from 0.1 to 15 wt %.

Catalyst Production/Activity vs. Cobalt Loading

It is known by those familiar with the art that the catalyst activity is a strong function, among other variables, of the catalyst loading or the amount of active metal impregnated. Since the active metal for the Fischer-Tropsch reaction is cobalt in its metallic form, then it follows that the more cobalt per catalyst particle external surface area, the higher the Fischer-Tropsch activity.

For discussion herein, the definition of the active metal loaded or Co wt % or cobalt impregnated or loaded is approximately 80% of the cobalt loaded as being in the metallic form and 20% of the cobalt loaded being present as CoO after reduction. That is, the sum of both the CO metal and CoO are used to calculate the wt % of the cobalt loaded.

To ascertain the effect of catalyst loading on the Fischer-Tropsch catalyst intrinsic activity, six catalysts were prepared and tested in a fixed bed micro reactor with an ID of 12 mm, a length of 40 cm, and loaded with Fischer-Tropsch catalyst diluted in crushed particles of silicon carbide of roughly the same size as the catalyst particles with a ratio of diluents to catalyst of 6:1 by volume.

The catalysts were prepared by multiple impregnations of a mixture of cobalt nitrate in water on an alumina support, with calcinations in air in between impregnations to convert the cobalt nitrate to cobalt oxide before the next impregnation.

The range of operating pressures was from approximately 390 to 410 psig and the range of the operating temperature was from approximately 380° F. to 420° F. The activity was calculated after about 120 hours on line by means of the Huff-Satterfield kinetic equation, shown below as Equation (1):

$$FT_r = -r_{CO} = K_t e^{(\Delta E/RT)} P_{H2} P_{CO} / (1 + a P_{CO})^2 \quad (1)$$

Where, $$a = x1 + x2 \times T(°K) \quad (2)$$

$FT_r = -r_{CO}$ is the Fischer-Tropsch rate expressed in cc CO reacted per cc catalyst per hour.

$P_{CO}$ and $P_{H2}$ are the kinetic average partial pressures of CO and $H_2$, in atm T is the reaction temperature, in ° K ΔE is the activation energy R is the Universal gas constant.

ΔE/R=−8000

"a" is the desorption coefficient, and $K_t$ is the pre-exponential factor or catalyst intrinsic activity at time "t"

The intrinsic activity of the catalyst is the activity to perform the Fischer-Tropsch reaction independently of the operating conditions under which the reaction is taking place.

By using Equation (1), all the 6 test runs can be compared equally, irrespective of differences in the operating conditions.

TABLE 1

| Test No | Cat No | Co Wt % | Operating Conditions | | | FT rate | $K_t \times 10^{-10}$ |
|---|---|---|---|---|---|---|---|
| | | | P (psig) | T (F.) | H2/CO | | |
| 1 | A084 | 20 | 410 | 415 | 2.0 | 408 | 1.68 |
| 2 | A087 | 20 | 400 | 415 | 2.0 | 380 | 1.70 |
| 3 | A090 | 20 | 410 | 420 | 2.0 | 375 | 1.59 |
| 4 | A097 | 30 | 410 | 404 | 2.0 | 660 | 2.75 |
| 5 | A098 | 30 | 410 | 392 | 1.8 | 590 | 3.03 |
| 6 | A229 | 40 | 390 | 380 | 2.0 | 444 | 4.13 |

The results from Tests 1 through 6 are shown in Table 1 and are shown graphically in FIG. 2. Table 1 shows each of the tests with the cobalt weight by percentage and the various operating conditions. From the results, it is evident that the higher the loading of the catalyst active metal, the higher the Fischer-Tropsch activity. It is also evident that at some point, the loading of too much active metal may result in the narrowing of the pore diameter with a resulting diffusion related higher methane selectivity and it may even reach regimes where the activity actually decreases, as more metal is added.

This was not the case for the Tests 1 through 6, where the activity versus metal loading showed an almost linear behavior. By looking only at these examples, it seems clear it is desirable to have as much active metal as possible on the Fischer-Tropsch catalyst. In order to avoid the negative effect of diffusion as the metal loading increases, the pore volume should increase correspondingly.

Catalyst Commercial Preparation—Effect of Pore Volume

When preparing an aqueous impregnation of cobalt nitrate on a metal oxide support, because of the limited solubility of cobalt nitrate in water, there is a maximum amount of equivalent active metal that can be deposited per impregnation step. This maximum amount is also a function of the support pore volume.

The higher the pore volume, the higher the amount of active metal that can be deposited per impregnation step.

This is shown in FIG. 4, where the total amount of active metal per impregnation has been calculated as a function of the pore volume. The reduction of the pore volume after each subsequent impregnation has been taken into account.

In a commercial preparation for an impregnated Fischer-Tropsch catalyst, each impregnation is followed by drying and calcinations in rotary kilns before the material is ready for the next impregnation. This means that the higher the number of impregnations to reach a targeted active metal loading, the more expensive and complicated the catalyst commercial manufacturing process is.

From FIG. 4, and from a commercial catalyst preparation consideration, it can be observed that the catalyst pore volume should be as high as possible in order to achieve high cobalt loading which is desirable in some commercial applications.

To determine the minimum amount of cobalt loading necessary for a practical commercial application, a simulation of different cobalt loadings and its effect on the reactor performance is described in Example 1.

Example 1

As an example of the effect of the active metal loading or catalyst intrinsic activity on the operating temperature of a commercial Fischer-Tropsch Fixed Bed reactor, the loading of 5 different catalysts was simulated, 10, 15 20, 30 and 40 cobalt wt % respectively, using a plug flow reactor model.

This model consists of 100 increments along the reactor. After each increment, the new partial pressures, temperature, and gas linear velocities are calculated. The rate of reaction was calculated using Equation (1).

The desired gas inlet linear velocity, calculated on an empty tube, was 24 cm/s, the catalyst bed height in this example is 18 feet, and the pressure drop is 25 psi. The reactor was running with a recycle ratio (mols recycle/mols feed) of 0.7 and the overall CO desired conversion is 90%.

The feed composition consists of 59.64 vol % H2, 28.92 vol % CO, 1.46 vol % CH4, 6.69 vol % CO2, and the balance is N2 and Ar.

The calculated average reactor temperatures to achieve the desired total CO conversion of 90% and the resulting methane selectivities (using Equation (9) to be described later on) for the different active metal loadings or cobalt wt % are:

| | Co Wt % | | | | |
|---|---|---|---|---|---|
| | 10 | 15 | 20 | 30 | 40 |
| Temperature (° F.) | 434 | 419 | 407 | 386 | 376 |
| CH4 selectivity, C wt % | 12.8 | 11.3 | 10.1 | 8.6 | 7.8 |

In a Fischer-Tropsch commercial plant, it is desirable that the methane selectivity be below 12 wt %, preferably below 10 wt %. In general, as the methane selectivity increases, the overall efficiency of the plant decreases. If the plant uses natural gas as feed, then it is very negative from an economic point of view to transform methane into synthesis gas and then to react the synthesis gas in a Fischer-Tropsch reactor and produce methane that is the plant original feed.

A cobalt loading of 10 wt % will have a low activity, making it necessary to increase the operating temperature to 434° F., obtaining a methane selectivity of 12.8 C wt %. Although the catalyst with cobalt loading of 15 wt % has a methane selectivity below 12 wt %, therefore suitable for commercial application, a catalyst with at least a 20 wt % cobalt loading is preferred since its methane selectivity is practically 10 C wt %

FIG. 4 also shows that after each impregnation, there are decreasing increments in the total amount of active metal loaded. For about 20 wt % of active metal and using 4 impregnation steps, the pore volume should be higher than about 0.35 cc/g. A higher volume will decrease the number of impregnation steps.

Effect of High Pore Volume on Catalyst Mechanical Strength

Support extrudates were prepared using commercially scalable extruders at different conditions to ascertain the effect of the preparation conditions on the support pore volume and on its mechanical strength.

The mechanical strength of the support is very important to avoid particle breakage mainly during the impregnation and calcination steps, as well as during the transport of the catalyst from the manufacturing plant to the Fischer-Tropsch plant and the loading of the catalyst into the Fischer-Tropsch reactor.

If there is particle breakage, the pressure drop during normal Fischer-Tropsch operation will be higher than designed and, depending upon the extent of the breakage, the catalyst may not even be suitable for loading or, if the breakage occurred during loading, for operation. The minimum typical catalyst crush strength for FTFB reactors is about 1 lb. per mm of extrudate.

Because of the above considerations, a program was developed to identify the best set of conditions for the preparation of the catalyst support, as well as to identify the catalyst property/properties that influence the mechanical strength of the support.

The preparation of the different alumina supports studied are as follows:

Prior to the water addition, the alumina support is calcined at a temperature in excess of 1000° C. in order to measure the loss on ignition ("LOI"). This preliminary step is important in order to calculate the amount of water to be added to the uncalcined alumina powder in order to obtain the desired LOI for extrusion. For the purposes of this study, the targeted LOI range was from about 46% to about 51%. In some cases, nitric or citric acid were added as a peptizing agent.

The alumina powder was placed in a container which could be a mixer or a muller. The liquid solution (water or water plus an acid) was added and the mixture was mixed or mulled for 10 to 40 minutes. After this, the paste was transferred to an extruder with 0.9 mm tri-lobe dies obtained from JMP Laboratories Inc.

After extrusion, the extrudates were dried for about one hour at 140° C. followed by calcinations for one hour at temperatures from 900° C. to 975° C. The calcined extrudates were tested for surface area, pore volume, pore diameter, and individual particle crush strength.

The preparation conditions and the properties of the calcined extrudates, ready for impregnation, are shown in Table 2.

TABLE 2

| | Sample # | | | | | | | |
|---|---|---|---|---|---|---|---|---|
| | 1 | 2 | 3 | 4 | 5 | 6 | 7 | 8 |
| Calc T, ° C. | 900 | 900 | 975 | 975 | 975 | 975 | 950 | 975 |
| LOI | 47.1 | 47 | 46.9 | 47.5 | 50 | 50.7 | 47.3 | 50 |
| Wt % Nitric | 0.0008 | 0 | 0 | 0 | 0 | 0 | 0.0008 | 0 |
| Wt % citric | 0 | 0 | 0 | 0 | 0 | 2 | 0 | 0 |
| Mull time, min | 20 | 20 | 30 | 10 | 10 | 20 | 10 | 20 |
| SA, m2/g | 83 | 81 | 76 | 74 | 68 | 68 | 80 | 79 |
| MPV, mL/g | 0.589 | 0.595 | 0.575 | 0.588 | 0.603 | 0.568 | 0.543 | 0.531 |
| MPD, nm | 22.5 | 23.3 | 23.1 | 22.7 | 26 | 25.7 | 21.2 | 22.3 |
| Crush strength, lb/mm | 1.05 | 0.93 | 0.96 | 1.14 | 0.96 | 1.48 | 2.07 | 2.14 |

An analysis of the data showed that the most important parameter to predict the mechanical or crush strength of the extrudates is the pore volume. This is shown in FIG. 3, where the crush strength decreases as the pore volume increases.

The crush strength limitation is a practical limit related to handling of the catalyst during manufacturing. It has been found that as metals are loaded onto the support, the crush strength of the finished catalyst is higher than the support alone. However, there needs to be a minimal level of strength for handling the support during manufacturing and 1 lb./mm was arbitrarily selected as a minimum target.

It has now been found that the crush strength of the extrudates can be greatly enhanced by one or more treatments. For example, alumina can be strengthened by addition of aluminum nitrate or by addition of a strong acid such as acetic acid or nitric acid. Acid can be added to the alumina before or after extrusion, but preferably is added before extrusion. After drying and calcining, the resulting alumina is much stronger.

FIG. 3 shows two graph lines that relate crush strength to pore volume. The lower graph line is based on 0.9 mm extrudates made with alumina powder that is mixed with water and in some cases a very low level of acid. The line shows a general relationship of pore volume with crush strength and demonstrates that as pore volume increases crush strength decreases. The relationship is very nearly linear.

The upper graph line of FIG. 3 is based on 0.9 mm extrudates made with the same alumina however; approximately 12% by weight of concentrated (70%) nitric acid was added to the alumina powder before mixing, extrusion and calcining. The treatment with a strong acid for this particular alumina obviously adds significant strength to the extrudates making it possible to extrude alumina with much higher pore volume. Extending the line until crush strength drops to the minimum requirement of 1 lb./mm indicates that the pore volume could be as high as 0.85 cc/gm. In fact with higher levels of acid, the pore volume could possibly be extended to even higher levels.

There are many ways to increase the pore volume of the alumina including addition of burnout agents and modification of the alumina crystal shape. Forming pellets or extrudates with such modified aluminas makes it possible to stay within desirable physical limits such as crush strength while using alumina with much higher pore volume, making it easier to reach desired metal loading targets with fewer impregnation steps.

Effect of Pore Diameter on Methane Selectivity

Because of diffusion considerations, the pore diameter must not be too small if a high methane selectivity is to be avoided. The effect of pore size on diffusion for FT catalysts is discussed in a paper by E. Iglesia, et al, published on Advances in Catalysis, Volume 39, pages 221 to 302. The methane selectivity is defined as the percentage of the carbon monoxide reacted that is converted to methane.

The open and patent literature discuss this issue, typically referring to the pore diameter of the support, but not including the narrowing effect of the loaded cobalt on the average pore diameter as well as relating it with the necessary amount of cobalt to be loaded for a practical commercial application.

Because of this narrowing effect, it is more accurate to use the real pore diameter after the active metal has been loaded, calcined and reduced in order to ascertain the effect of pore diameter on the catalyst performance.

In this invention, an effective average pore diameter is described as the average pore diameter after loading of the FT active metal precursor, calcinations to obtain the metal oxide, and reduction to obtain the active metal. For the calculations, we assumed a typical total metal precursor reduction of 80%. In the case of cobalt, 80% of the cobalt loaded is reduced to cobalt metal and about 20% remains as CoO. This is, therefore, the degree of reduction that is part of the definition of the effective pore diameter. The densities used for this calculation were 8.9 g/cc for cobalt metal and 6.11 g/cc for CoO.

While it is understood that this is the typical degree of reduction, in practice, the degree of reduction in a commercial Fischer-Tropsch reactor may have some degree of variation, although the effect will be minimal for the purpose of these calculations.

The effective pore diameter is determined by calculating the volume of the impregnated active metal after the reduction of the cobalt oxide and subtracting it from the original pore volume and recalculating the new pore diameter using the new pore volume and the initial surface area. A calculation example follows.

Example 2

Calculation of the Effective Pore Diameter

For the same family of metal oxide supports, e.g. silica, alumina, titania, etc., the average pore diameter, the total pore volume, and the surface area are interrelated. Because of geometric considerations, changing two of these three variables will inevitably result in a different value for the third one. A typical equation used to express this relationship is shown in Equation 3 below:

$$\text{Avg Pore diameter (nm)} = 4000 \times \text{Pore volume (cc/g)} / \text{Surface area (m}^2\text{/g)} \quad (3)$$

Amount of reduced catalyst=100 g
Cobalt loading=40 Wt % or 40 g
Pre-impregnated support area and avg pore diameter=100 m2/g and 15 nm
Using Equation 3, the pore volume of the pre-impregnated support is 0.38 cc/g
Total pore volume for 60 g support=60 g×0.38 cc/g=22.5 cc
Amount cobalt metal, Co: 40 g×80% reduction=32 grams
Amount cobalt oxide, CoO=40 g-32 g=8 g
Density Co and CoO=8.9 and 6.4 g/cc
Total volume Co and CoO=32 g/8.9 g/cc+8 g/6.4 g/cc=4.85 cc
Total pore vol after impregnations, calcinations and reduction=22.5-4.85=17.65 cc
New pore volume=17.65 cc/60 g support=0.29 cc/g Assuming the same initial area and using equation (3), the new average pore size diameter or effective average pore diameter is 11.7 nm.

The use of this technique to calculate the effective pore diameter is a simplification but it is believed to be better than just calculating the new pore diameter by distributing the cobalt volume evenly over the catalyst surface. This, because the support is formed by an agglomeration of very small particles, and the impregnated cobalt is deposited in between them with a corresponding enhanced effect on the narrowing of the pores (or open volume in between particles).

This approximation is believed to be more accurate than to merely use the support pore diameter without taking into account the narrowing of the pores effect due to the amount of active metal to be loaded.

An example of the effect of the effective pore diameter on the methane selectivity is shown in the following example. The particle size of the catalysts tested in Table 3 was between 0.4 to 0.55 mm.

TABLE 3

| Test No. | Cat. No. | Avg. pore size, nm | Effective pore size, nm | CH4 Selectivity (C wt %) |
|---|---|---|---|---|
| 1 | A084 | 8.1 | 7.7 | 11.8 |
| 2 | A087 | 16.6 | 15.7 | 10.5 |
| 3 | A090 | 15.1 | 14.2 | 11.7 |
| 4 | A097 | 8.1 | 7.4 | 15.5 |
| 5 | A098 | 8.1 | 7.4 | 13.0 |
| 6 | A229 | 17.5 | 14.9 | 8.5 |

The results from Table 3 are plotted in FIG. 5. As previously discussed, in a commercial plant, it is desirable to have a methane selectivity below 12 C wt %, preferably below 10 C wt %. To achieve this, the effective pore diameter must be greater than about 14 nm.

The effective pore diameter of greater than 14 nm must also be expressed taking into account both the surface area and the upper and lower limits for the total pore volume, defined by the mechanical strength of the support and by the ease of commercial manufacture of the catalyst, respectively.

For example, if a support of area 100 m$^2$/g is loaded with 40 wt % of the active metal, in order to have an effective pore diameter of at least 14 nm, the support must have an average pore diameter of 17.2 nm and a pore volume of 0.43 cc/g.

If a support has an area of 150 m$^2$/g and is loaded with the same amount of active metal, in order to have an effective pore diameter of at least 14 nm, it must have an initial average pore diameter of 16.2 nm and a pore volume of 0.61 cc/g.

If the support has an area of 70 m$^2$/g and loaded with the same amount of active metal, in order to have an effective pore diameter of at least 14 nm, it must have an initial average pore diameter of 18.6 nm and a pore volume of 0.3 cc/g. Here, the pore volume is outside the catalyst commercial manufacture requirements as the pore volume is too low.

Since the pore volume, pore diameter, and surface area are interrelated, as shown by Equation (3), it is possible to derive a general equation that calculates the minimum average pore diameter of the support so that after impregnations, calcinations, and reduction of the active metal or cobalt, the effective pore diameter is at least 14 nm.

Because the extent of narrowing of the pore is a function of the amount of active metal loaded, this general equation will apply only for a specific amount of cobalt loaded.

For each specific amount of cobalt loaded, e.g., 20, 30 and 40 wt % cobalt, a set of calculations were performed, each one for a different support surface area. The purpose of these calculations was to determine the initial support average pore diameter (before the cobalt loading and reduction) so that, for example, for a support of 100 m2/g and 30 wt % cobalt loaded, the effective average pore diameter will be 14 nm.

The results obtained are shown in FIG. 6a. This Figure shows the average pore size diameter before impregnation that the support must have so that, after the cobalt loading and reduction, the effective average pore diameter is 14 nm. As expected, each specific amount of cobalt loading has its own curve. A statistical regression using a power type equation (solid lines in FIG. 6a was not very efficient to predict the data.

Further analysis of the data gave a maximum correlation factor ($r^2$) of 0.997 when a constant (in this case 32 m2/g) was subtracted from the surface area. The results are shown in FIG. 6b.

The equations shown in FIG. 6b as a function of the wt % of cobalt loading are shown in Equations (4a), (4b), (4c) and (4d).

| Cobalt loading | Equation | |
| --- | --- | --- |
| 15 wt % | Support avg pore diam = 17.485 (Area-32)$^{-0.038}$ | (4a) |
| 20 wt % | Support avg pore diam = 19.012 (Area-32)$^{-0.052}$ | (4b) |
| 30 wt % | Support avg pore diam = 22.9 (Area-32)$^{-0.083}$ | (4c) |
| 40 wt % | Support avg pore diam = 28.427 (Area-32)$^{-0.118}$ | (4d) |

The above equations are of the form:

$$Y = a X^b \quad (5)$$

It is possible to generalize Equations (4a) to (4d) by describing "a" and "b" in Equation (5) as a function of the cobalt loading.

A statistical regression was performed and the results are shown in Equations (6a) and (6b):

$$a = 0.4372 \times wt\% \text{ cobalt} + 10.48 \quad (6a)$$

$$b = 0.0113 - 0.0032 \times wt\% \text{ cobalt} \quad (6b)$$

A parity plot to test the accuracy of equations (6a) and (6b) showed that the equations are very accurate, with correlation factors ($r^2$) of 0.987 and 0.998 respectively.

By combining Equations (4a to 4d) with Equations (6a) and (6b), it is possible to arrive to a general equation that defines the average pore diameter that the support must have, before cobalt loading and reduction, in order to have an effective pore size diameter of 14 nm. This general equation is shown as Equation (7).

$$\text{Support APD} = (0.4372 \times wt\% \text{ Co} + 10.48) \times (\text{Area} - 32)^{(0.0113 - 0.0032 \times wt\% \text{ Co})} \quad (7)$$

Where the average pore diameter or APD is expressed in nm and the surface area in m²/g.

A comparison between the prediction of Equation (7) versus the calculation procedure shown in Example 2 for the calculation of the effective average pore diameter was performed for the range of 15 to 40 wt % of cobalt and areas from 40 to 200 m2/g. The accuracy of Equation (7) was +/−2%.

The requirement for the effective average pore diameter for an optimum Fischer-Tropsch catalyst, as previously discussed, is that it must be at least 14 nm. This condition is now reflected in Equation (8).

$$\text{Support APD} = \text{or} > (0.4372 \times wt\% \text{ Co} + 10.48) \times (\text{Area} - 32)^{(0.0113 - 0.0032 \times wt\% \text{ Co})} \quad (8)$$

From the above discussions, the optimum characteristics for the metal oxide support, for example alumina, for a Fischer-Tropsch cobalt catalyst must be such that the conditions in Equation (8) must be met within a pore volume range of between 0.35 to 0.85 cc/g.

When taking into account that the support pore volume must be between 0.35 cc/g to 0.85 cc/g, then it is possible to delineate a region where all the requirements of pore volume (for mechanical strength and manufacturing considerations) and minimum effective pore diameter are met, that is, an optimal region. An example of this optimal region, for a cobalt loading of 30 wt %, is shown in FIG. 6c as a shaded area.

The lower limit of the shaded area is defined by Equation (4c) (although Equation (7) would produce the same curve).

The limit on the right side of the shaded area is defined by a curve for a pore volume of 0.85 cc/g. The curve has been constructed by replacing the "Pore Volume" in Equation (3) by 0.85. Any average support pore diameter before impregnation and reduction above this curve will have a pore volume greater than 0.85 cc/g and is outside the acceptable characteristics of an optimum support.

The limit on the left side of the shaded area is defined by a curve for a pore volume of 0.35 cc/g. The curve has been constructed by replacing the "Pore Volume" in Equation (3) by 0.35. Any average support pore diameter before impregnation and reduction below this curve will have a pore volume lower than 0.35 cc/g and is outside the acceptable characteristics of an optimum support.

The upper limit of 40 nm in FIG. 6c is defined by the effect of the average pore size on the cobalt crystallite size and, therefore, on the dispersion of the cobalt metal and its effect on the catalyst activity.

When the cobalt is loaded on a metal oxide support and reduced, its physical form is in spherically shaped crystallites. Typically, the crystallite size is present in different sizes, ranging from about 2 to about 35 nm or higher. It is known that the larger the average pore size, the larger the average crystallite size (e.g. U.S. Pat. No. 7,541,310, FIG. 4). The crystallite cannot be larger than the specific "pore" or space in between support aggregates inside which it grows. A support with an average pore diameter of 40 nm may result in cobalt crystallites with an average size of 30 nm or higher, depending on the amount of cobalt loaded. An average crystallite size of 30 nm will result in a cobalt dispersion of about 3%. This means that only 3% of the cobalt metal is present in the external surface area of the spherical crystallite and available to catalyze the Fischer-Tropsch reaction, while the remaining 97% of the cobalt is inside the spherical crystallite, unable to contribute to the reaction.

While larger crystallites are easier to reduce and more resistant to re-oxidation, they result in a low dispersion and, therefore, lower catalyst activity for the Fischer-Tropsch reaction. On the other hand, smaller crystallites, although they have a potentially larger percentage cobalt metal on the external surface of the spherically shaped crystallite, are more difficult to reduce and tend to re-oxidize (and therefore deactivate the catalyst) faster than the larger crystallites.

Because of the above considerations, an optimum average cobalt crystallite size should be larger than about 5 nanometers and smaller than about 30 nm.

These considerations are the basis for the upper limit of 40 nm for the average pore diameter of the support before cobalt impregnations and reduction shown in FIG. 6c.

The same approach can be taken for other cobalt loadings to produce figures similar to FIG. 6c.

All the shaded area that delineates the optimal average pore size of the support before cobalt loading and impregnation as a function of wt % of cobalt and support surface area before impregnation and reduction, by means of Equation (8), the two equations derived from Equation (3) for pore volumes of 0.85 cc/g and 0.35 cc/g and an upper limit for the average pore diameter of the support of 40 nm.

Effect of Extrudate Diameter

While the support can be an extrudate, tablet, oil drop sphere, crushed and sieved particle or any other shape known to one skilled in the art, extrudate is the preferred shape for our invention.

There are two main effects of the extrudate diameter besides its obvious influence on the mechanical strength for the optimization of a Fischer-Tropsch catalyst for application in a fixed bed reactor: the pressure drop, which increases as the extrudate diameter decreases; and the methane selectivity, which increases considerably above a critical extrudate diameter.

A higher pressure drop inside the catalyst bed will also require a higher inlet pressure to maintain a targeted average reaction pressure, therefore resulting in a larger gas compressor and higher operating costs. In the case of more than one Fischer-Tropsch stage, the compression requirements become even more relevant and costly.

A high pressure drop will also require a higher mechanical strength of the catalyst particles, particularly if they are in the shape of extrudates, to avoid their breakage, which in turn will further increase pressure drop.

Because of the above considerations, it is preferable to develop catalyst particles that will, because of their physical characteristics, cause a pressure drop as low as possible under any given set of operating conditions.

FIG. 7 shows the expected pressure drop in psi/ft for a fixed bed reactor running at typical commercial conditions. For these calculations, the Ergun equation was used below, and a syngas feed with an $H_2/CO$ ratio of 2:1, 10% inerts (e.g. nitrogen), 350 psig inlet reactor pressure, a CO per pass conversion of 60%, and an alpha value of 0.92. The particle size ratio of Length/Diameter used was 2:1.

Notice that the pressure drop shows an exponential type of response with the catalyst particle size, being particularly pronounced for particle sizes below 0.4 mm.

Because of this behavior, and due to pressure drop considerations, it is preferred that the extrudate have a diameter larger than 0.4 mm.

The effect of the catalyst particle size on the undesirable methane selectivity is shown in Table 4. In this example, all the catalysts supports were prepared using the same batch of alumina to avoid the possible effect of the metal oxide support on the methane selectivity. They all have similar effective pore diameter that are within the target limits described by FIG. 6c.

TABLE 4

Effect of the particle size on the methane selectivity

| Catalyst | Diameter μm | Temp °F. | Press psig | H2/CO in | CO Conv % | CH4 sel Wt % |
|---|---|---|---|---|---|---|
| A0084 | 1000 Extrudate | 410 | 420 | 1.9-2 | 30-35 | 27 |
| CO133-1 | 800 shaped extrudate | 394 | 405 | 1.94 | 56 | 11.9 |
| A0087 | 500-600 crushed | 415 | 420 | 1.3-2 | 65-70 | 9-11 |
| A00108 | 500 extrudate | 395 | 400 | 1.9 | 57-65 | 8-9.3 |
| A00216 | 400 extrudate | 380 | 400 | 2 | 30 | 5-7 |

Table 4 shows that, in spite of optimal support characteristics as described by the present invention, methane selectivity is still strongly influenced by the particle size. The methane selectivity increases with the catalyst particle diameter, although the selectivity value shows a jump when the catalyst particle, in this case the extrudate diameter, reached a value of 1000 μm, or 1 mm.

This large increase in the methane selectivity is present even though the range of operating conditions falls within the group range. Therefore, it is preferable that the catalyst particle size be below 1 mm diameter.

To further ascertain the effect of the catalyst particle size, a predictive equation (Equation 9) for the methane selectivity was developed by means of varying the temperature and the partial pressure of reactants and products. The micro reactor runs also included different Fischer Tropsch reaction rates, expressed in ccCO reacted per cc catalyst per hour and three different catalyst extrudate diameters: 0.4, 0.6 and 0.8 mm.

This predictive methane selectivity equation was developed for catalysts with a support that falls within the optimal shaded region in FIG. 6c. The range of operating conditions used for the development of Equation (9) is shown in Table 5.

TABLE 5

Range of operating conditions for the development of Equation (7)

| FT rate | 128 | 1084 |
|---|---|---|
| H2/CO ratio | 1.27 | 2.04 |
| PH2 | 2.1 | 11.3 |
| PCO | 1.6 | 5.8 |
| PH2O | 0.4 | 2.9 |
| t | 100 | 3600 |
| T | 375 | 395 |
| CH4 Sel | 6.4 | 18.8 |

$$CH_4Sel_{t=t} = 3.48 \times 10^6 \, t^{-0.06} \, e^{(\Delta E/RT)} * P_{H2} * P_{CO}^{-1.2} * P_{H2O}^{-0.6} + CF \quad (9)$$

The CF term is the correction factor for the FT rate and the particle diameter, expressed as:

$$CF = ((0.0312 \times PD) \times FT\,rate - (6.264 \times PD - 1.518)) \quad (10),$$

Where:
CH4 Sel=% Mols CO reacted converted to CH4
t=run time in hours
ΔE/R=−6000
T=Temperature in K
Pi's=Partial pressures in atm
PD=Catalyst extrudate diameter in mm
FT rate=cc CO reacted per cc of catalyst per hour A parity plot for the experimental methane selectivity versus the predicted selectivity using Equation (9) is shown in FIG. 8. From this figure, it is apparent that Equation (9) is very accurate for the prediction of the methane selectivity (C wt %) as a function of the operating conditions, time on line, the catalyst extrudate diameter, and the Fischer-Tropsch reaction rate. Notice that catalyst extrudates of about 0.8 mm diameter had a methane selectivity well below 10 C wt %.

The inclusion of the Fischer-Tropsch reaction rate in Equation (9) is due to the effect of high reaction rates on the diffusional load of the catalyst pores. It is not sufficient to determine the effect of the particle diameter without taking into account the reaction rate. For example, if a catalyst of 1 mm diameter is operated under conditions of very low CO conversion or reaction rate, its effect on the selectivities will be either very small or negligible. This, however, would not be practical from a commercial point of view.

If we choose to ignore the combined effects of the particle diameter and of the reaction rate as expressed in Equation (10), equation (9) becomes:

$$CH_4 Sel_{r=i} = 3.48 \times 10^6 \, t^{-0.06} \, e^{(\Delta E/RT)} * P_{H2} * P_{CO}^{-1.2} * P_{H2O}^{-0.6} \quad (11)$$

FIG. 9 shows the same parity plot as that in FIG. 8, but now, using Equation (11). An examination of FIG. 8 clearly shows the failure of Equation (11) for the prediction of the experimental methane selectivity. This also confirms the strong effect of the increasing catalyst particle size on increasing the methane selectivity, which is enhanced even more at high Fischer-Tropsch reaction rates.

Preferred Fischer-Tropsch Selectivity

The product's selectivity for the Fischer-Tropsch products can be conveniently defined by the chain growth probability of the growing hydrocarbon chain absorbed on the active metal. This chain growth probability is commonly referred to as "alpha" value, or "α"

Alpha is a measure of the probability that an adsorbed growing chain will either desorb and exit the catalyst pore without further growth or grow by one more carbon number. Normally methane and, to a certain extent, C2 hydrocarbons do not follow this rule, but for the C3+ hydrocarbons, alpha is independent of the carbon number. Therefore, by definition, alpha can be calculated using Equation (12):

$$\text{Alpha} = \text{Mols } C_{n+1} \text{ in products}/\text{Mols } C_n \text{ in products} \quad (12)$$

Where n>2.

Whether the Fischer-Tropsch plant is oriented towards fuels or chemicals, it is preferable to have the primary products from Fischer-Tropsch as heavy as possible. This is because if the plant is wax or lubes (made from the Fischer-Tropsch wax) oriented, then the higher the alpha value the higher the selectivity of the plant towards those desired products. If the plant is fuel oriented, the Fischer-Tropsch wax will be subject to a hydrocracking process to convert it to naphtha and diesel. In this case, the higher the alpha value the higher the plant total selectivity towards diesel and the lower the plant total selectivity towards naphtha.

The Fischer-Tropsch diesel has a cetane number in excess of 70, zero sulphur compounds, and practically zero aromatics. This makes it an excellent blend stock with crude derived diesel. Because of these properties, diesel is the preferred fuel product from low temperature Fischer-Tropsch plants.

The Fischer-Tropsch naphtha, on the other hand, although it also has zero sulphur and has practically zero aromatics, is composed by about 97% of linear hydrocarbons and, therefore, its octane value is very low. This means that naphtha does not have much value as fuel unless it undergoes severe hydrotreatments that lowers its yield substantially.

Table 6 shows the primary Fischer-Tropsch selectivities as well as the final plant selectivities after the wax was treated in the hydrocracker. It can be shown graphically that there is an inflexion point with diminishing returns for the selectivity of wax or for the selectivity of diesel as the final plant product. This point with diminishing returns is at about an alpha value of 0.89. At this point, the diesel to wax weight ratio is 1.07.

Because of the above reasons, an optimum Fischer-Tropsch catalyst should have an alpha value of at least 0.89.

TABLE 6

Effect of the alpha value on the selectivity of the Fischer-Tropsch primary products and on the plant final products

| Products | Alpha value | | | | | | |
|---|---|---|---|---|---|---|---|
| | 0.93 | 0.92 | 0.91 | 0.9 | 0.89 | 0.88 | 0.87 |
| Fischer-Tropsch primary products | | | | | | | |
| C2 to C4 | 3.49 | 4.46 | 5.52 | 6.67 | 7.90 | 9.19 | 10.55 |
| Naphtha | 10.14 | 12.42 | 14.72 | 17.03 | 19.29 | 21.49 | 23.61 |
| Diesel | 24.27 | 27.46 | 30.08 | 32.14 | 33.64 | 34.61 | 35.10 |
| Wax (C20+) | 54.49 | 48.07 | 42.07 | 36.56 | 31.57 | 27.10 | 23.14 |
| Weight ratio diesel/wax | 0.45 | 0.57 | 0.72 | 0.88 | 1.07 | 1.28 | 1.52 |
| Overall Plant final products | | | | | | | |
| C2 to C4 | 5.5 | 6.2 | 7.1 | 8.1 | 9.2 | 10.4 | 11.62 |
| Naphtha | 22.1 | 23.1 | 24.1 | 25.3 | 26.5 | 27.8 | 29.10 |
| Diesel | 64.9 | 63.1 | 61.1 | 59.0 | 56.7 | 54.2 | 51.68 |
| Overall C5+ Plant final products | | | | | | | |
| Naphtha | 25.41 | 26.75 | 28.30 | 30.03 | 31.91 | 33.91 | 36.02 |
| Diesel | 74.59 | 73.25 | 71.70 | 69.97 | 68.09 | 66.09 | 63.98 |

Example of the Performance of a Catalyst Prepared According to the Teachings of the Prevent Invention A support with physical properties within the shaded area of FIG. 6 was impregnated multiple times with a solution of cobalt nitrate diluted in water following the incipient wetness impregnation procedure. After each impregnation, there was a calcination step at about 300° C. to decompose the nitrate into oxide. This procedure was repeated until the total amount of active metal was about 40 wt %.

About 5 cc of catalyst was loaded in a micro reactor, diluted in silicon carbide in a proportion of 6 to 1. The catalyst was reduced at a temperature of about 245° C. for 36 hours, after which the syngas feed was introduced to the reactor. The reactor run continued without any interruptions for catalyst regeneration or rejuvenation for over 4000 hours. The results obtained are shown in Table 7 below. The methane selectivity is lower than 12% and the alpha value is higher than 0.89.

TABLE 7

Performance of a catalyst prepared according to the teachings of the present invention

| hrs on line | 800 | 1200 | 3000 | 4000 |
|---|---|---|---|---|
| Pressure, psig | 405 | 405 | 405 | 405 |
| Temperature, ° F. | 375 | 378 | 380 | 384 |
| H2/CO in | 1.62 | 1.62 | 1.65 | 1.65 |
| % CO conversion | 50.5 | 54.3 | 56.7 | 60.1 |
| FT rate of reaction ccCO conv/cc cat/h | 465 | 467 | 413 | 410 |
| CH4 selectivity (C wt %) | 7.9 | 7.2 | 6.7 | 6.6 |
| CO2 selectivity (C wt %) | 0.65 | 0.64 | 0.68 | 0.74 |
| Alpha value | 0.92 | 0.93 | 0.93 | 0.93 |

Whereas, the present invention has been described in relation to the drawings attached hereto, it should be understood that other and further modifications, apart from those shown or suggested herein, may be made within the spirit and scope of this invention.

What is claimed is:

1. A cobalt containing catalyst supported on a metal oxide support, useful for performing the Fischer-Tropsch reaction in a fixed bed reactor, which catalyst comprises:
   a. a metal oxide support of a pore volume, before loading of cobalt thereon, within the range of 0.35 to 0.85 cc/g;
   b. the metal oxide support having an average pore diameter, before the cobalt loading and reduction, as defined by the following equation:

$$\text{Support APD} = (0.4372 \times \text{wt \% Co} + 10.48) \times (\text{Area} - 32)^{(0.0113 - 0.0032 \times wt\% Co)}$$

such that the effective average pore diameter, after cobalt loading and reduction is 14 nm or higher;
   c. a catalyst particle size between 0.4 to 1 mm;
   d. a mechanical strength of the catalyst, if in extrudate form, of at least 1 lb/mm;
   e. a methane selectivity below 12 (Carbon) wt %;
   f. a cobalt loading of 11 wt % or higher;
   g. an alpha value higher than 0.89; and
   h. a diesel to wax weight ratio below 1.07.

2. The catalyst of claim 1 wherein the catalyst further comprises one or more promoters chosen from the group consisting of: Pt, Pd, Ru, Re, Cu and Ag in amounts ranging from 0.01 to 3 wt %.

3. The catalyst of claim 1 wherein the catalyst further comprises one or more promoters chosen from the group consisting of: Mn, Ba, Si, Ti, Ce, Zr, La, Na, K, Zn, Ag, Cu, Li, Ca, Cr, Ni, Fe, V, Sn, Ga, Sb, Th and W in amounts ranging from 0.1 to 15 wt %.

4. The catalyst of claim 1 wherein the metal oxide is chosen from the group consisting of: silica, alumina, titania, zirconia or combinations thereof.

5. The catalyst of claim 4 wherein the metal oxide is alumina.

6. The catalyst of claim 1 wherein the support is treated with a strong acid before or after extrusion to increase crush strength.

7. The catalyst of claim 6 wherein the strong acid is acetic acid or nitric acid.

8. A cobalt containing catalyst supported on a metal oxide, useful for performing the Fischer-Tropsch reaction in a slurry bubble column reactor, which catalyst comprises:
   a. a metal oxide support having a pore volume, before loading of cobalt thereon, within the range of 0.35 to 0.85 cc/g;
   b. the metal oxide support having an average pore diameter, before the cobalt loading and reduction, as defined by the following equation:

$$\text{Support APD} = (0.4372 \times \text{wt \% Co} + 10.48) \times (\text{Area} - 32)^{(0.0113 - 0.0032 \times wt\% Co)}$$

such that the effective average pore diameter, after cobalt loading and reduction, is 14 nm or higher;
   c. a catalyst particle size between 20 to 250 μm;
   d. a methane selectivity below 12 (Carbon) wt %;
   e. a cobalt loading of 11 wt % or higher;
   f. an alpha value higher than 0.89; and
   g. a diesel to wax weight ratio below 1.07.

9. The catalyst of claim 8 wherein the catalyst further comprises one or more promoters chosen from the group consisting of: Pt, Pd, Ru, Re, Cu and Ag in amounts ranging from 0.01 to 3 wt %.

10. The catalyst of claim 8 wherein the catalyst further comprises one or more promoters chosen from the group consisting of: Mn, Ba, Si, Ti, Ce, Zr, La, Na, K, Zn, Ag, Cu, Li, Ca, Cr, Ni, Fe, V, Sn, Ga, Sb, Th and W in amounts ranging from 0.1 to 15 wt %.

11. The catalyst of claim 8 wherein the metal oxide is chosen from the group consisting of: silica, alumina, titania, zirconia or combinations thereof.

12. The catalyst of claim 11 wherein the metal oxide is alumina.

13. The catalyst of claim 8 wherein the support is treated with a strong acid before metal addition to increase crush strength.

14. The catalyst of claim 13 wherein the strong acid includes acetic acid or nitric acid.

* * * * *